(12) United States Patent
Ren et al.

(10) Patent No.: US 10,685,214 B2
(45) Date of Patent: Jun. 16, 2020

(54) FACE DETECTION WINDOW REFINEMENT USING DEPTH

(71) Applicant: INTEL CORPORATION, Santa Clara, CA (US)

(72) Inventors: Haibing Ren, Beijing (CN); Yimin Zhang, Beijing (CN); Sirui Yang, Beijing (CN); Wei Hu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 15/755,467

(22) PCT Filed: Sep. 25, 2015

(86) PCT No.: PCT/CN2015/090810
§ 371 (c)(1),
(2) Date: Feb. 26, 2018

(87) PCT Pub. No.: WO2017/049626
PCT Pub. Date: Mar. 30, 2017

(65) Prior Publication Data
US 2018/0247110 A1 Aug. 30, 2018

(51) Int. Cl.
*G06T 7/80* (2017.01)
*G06K 9/00* (2006.01)
(Continued)

(52) U.S. Cl.
CPC ..... *G06K 9/00255* (2013.01); *G06K 9/00201* (2013.01); *G06K 9/00228* (2013.01);
(Continued)

(58) Field of Classification Search
CPC . G06T 2207/30201; G06T 7/50; G06T 7/194; G06T 7/11; G06T 7/13;
(Continued)

(56) References Cited

U.S. PATENT DOCUMENTS

| 2013/0202161 A1* | 8/2013 | Shor ................. G06K 9/00201 382/118 |
| 2014/0043499 A1 | 2/2014 | Park et al. |
| 2016/0014392 A1* | 1/2016 | Liang ....................... G06T 7/11 348/47 |

FOREIGN PATENT DOCUMENTS

| CN | 103020101 A | 4/2013 |
| CN | 103514429 A | 1/2014 |

(Continued)

OTHER PUBLICATIONS

International Search Report and Written Opinion issued in PCT Application No. PCT/CN2015/090810, dated May 10, 2016, 8 pages.
(Continued)

*Primary Examiner* — Jingge Wu
(74) *Attorney, Agent, or Firm* — Grossman, Tucker, Perreault & Pfleger, PLLC (57) ABSTRACT

The present disclosure is directed to face detection window refinement using depth. Existing face detection systems may perform face detection by analyzing portions of visual data such as an image, video, etc. identified by sub-windows. These sub-windows are now determined only based on pixels, and thus may number in the millions. Consistent with the present disclosure, at least depth data may be utilized to refine the size and appropriateness of sub-windows that identify portions of the visual data to analyze during face detection, which may substantially reduce the number of sub-windows to be analyzed, the total data processing burden, etc. For example, at least one device may comprise user interface circuitry including capture circuitry to capture both visual data and depth data. Face detection circuitry in the at least one device may refine face detection by determining criteria for configuring the sub-windows that will be used in face detection.

24 Claims, 4 Drawing Sheets

(51) Int. Cl.
*G06T 7/194* (2017.01)
*G06T 7/11* (2017.01)
*G06K 9/62* (2006.01)

(52) U.S. Cl.
CPC .............. *G06K 9/6292* (2013.01); *G06T 7/11* (2017.01); *G06T 7/194* (2017.01); *G06K 2209/21* (2013.01); *G06T 2207/30196* (2013.01)

(58) Field of Classification Search
CPC ......... G06T 7/55; G06T 7/74; G06T 2200/24; G06T 7/586; G06T 7/70; G06T 7/73; G06K 9/00255; G06K 9/00281; G06K 9/00604; G06K 9/00221; G06K 9/00248; G06K 9/209; G06K 9/6292
See application file for complete search history.

(56) References Cited

FOREIGN PATENT DOCUMENTS

| | | |
|---|---|---|
| CN | 103530892 A | 1/2014 |
| CN | 103971103 A | 8/2014 |
| WO | 2017-049626 A1 | 3/2017 |

OTHER PUBLICATIONS

International Preliminary Report on Patentability and Written Opinion issued in PCT Application No. PCT/CN2015/090810, dated Mar. 27, 2018, 5 pages.
Liu, Gang et al.: "Face Contour Extraction Algorithm Based on Skin Luma and Depth Information", Journal of Southern Yangize University (Natural Science Edition), vol. 5, No. 5, Oct. 31, 2006, pp. 513-517, with English Abstract, 5 pages.
Meyer, Gregory P., et al.: "Accelerating face detection with RGB-D Images", University of Illinois, ICIP 2014, 4 pages.

* cited by examiner

FIG. 2

Example 200

FIG. 3

FACE DETECTION WINDOW REFINEMENT USING DEPTH

CROSS-REFERENCE TO RELATED APPLICATIONS

This present application is a National Phase Application Filed Under 35 U.S.C. 371 claiming priority to PCT/CN2015/090810 filed Sep. 25, 2015, the entire disclosure of which is incorporated herein by reference.

TECHNICAL FIELD

This disclosure relates to image processing, and more particularly, to a system that may expedite face detection in at least one of an image or video based on sensed depth data.

BACKGROUND

While visual data capture (e.g., image or video capture) has been utilized for a variety of purposes, new technologies are starting to make available new and/or improved utilization. For example, data analysis operations may be performed on visual data to extract features of the visual data. Feature recognition, motion detection, etc. may be employed for a variety of uses. Face detection may be used in robotics to allow robots to locate faces, identify people, etc. Moreover, image and/or video capture may commonly occur at transportation hubs (e.g., airports, train terminals, bus stations, etc.), entertainment venues (e.g., stadiums, arenas, theatres, etc.), medical service providers (e.g., hospitals, drug dispensaries, etc.), educational and governmental institutions, commercial locations, etc. At least one use for image capture in these locations is security. For example, image and/or video data may be reviewed on the occurrence of an incident to determine what happened, who was involved, how the situation should be resolved, etc. Feature recognition such as facial detection may be used to analyze the image/video data to determine actors/factors that caused the event, victims, rescuers, etc.

Algorithms that are currently available for face detection and tracking may include, for example, color extraction, motion detection, model-based face tracking, edge-orientation tracking, weak classifier cascades, etc. A widely used version of weak classifier cascades is the Viola-Jones Object Detection Framework. In the Viola-Jones algorithm, image pixels in rectangular areas or "sub-windows" within an image/video may be summed. The difference between the summation of the light and dark areas may be indicative of certain features (e.g., certain combinations of light and dark areas) that may be indicative of a human face. While this manner of face detection may be effective, it is greatly affected by the amount of pixels being evaluated. For example, a 640×480 image may comprise approximately 1.4 million sub-windows for evaluation. Depending on the capabilities of the analysis system, having to analyze such a large amount of sub-windows may place substantial processing burden on the analysis system, which may then take longer to perform facial detection. Moreover, image and/or video capture technology is constantly improving, which means that the pixel size of images and/or video constantly increasing, placing a larger burden on the analysis system.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure is directed to face detection window refinement using depth. Existing face detection systems may perform face detection by analyzing portions of visual data such as an image, video, etc. identified by sub-windows. These sub-windows are now determined only based on pixels, and thus may number in the millions. Consistent with the present disclosure, at least depth data may be utilized to refine the size and appropriateness of sub-windows that identify portions of the visual data to analyze during face detection, which may substantially reduce the number of sub-windows to be analyzed, the total data processing burden, etc. For example, at least one device may comprise user interface circuitry including capture circuitry to capture both visual data and depth data. Face detection circuitry in the at least one device may refine face detection by determining criteria for configuring the sub-windows that will be used in face detection. The criteria may be determined based on, for example, a distance from the device to objects in the visual data that may comprise faces, depth differences that may be sensed between areas inside and outside of sub-windows, etc. The criteria may be used to size the sub-windows, determine sub-windows that potentially comprise faces, etc.

In at least one embodiment, at least one device to perform face detection may comprise, for example, at least user interface circuitry and face detection circuitry. The user interface circuitry may include at least capture circuitry to capture at least visual data and depth data corresponding to the visual data. The face detection circuitry may be to refine face detection by determining criteria for one or more sub-windows utilized to identify portions of the visual data on which face detection will be performed, wherein the criteria are based at least on the depth data. The face detection circuitry may then perform face detection utilizing the one or more sub-windows that conform to the criteria.

The visual data may comprise, for example, at least one of image data or video data. In at least one embodiment, the criteria may comprise at least one dimension of the one or more sub-windows. The face detection circuitry may be to determine the criteria based on a distance sensed to at least one object in the visual data. The face detection circuitry may further be to, for example, determine the at least one dimension based on an approximation of a size at which a human face would appear in the visual data at the sensed distance.

In the same or another embodiment, the criteria may comprise at least one difference in depth data. The face detection circuitry may be to determine the criteria based on differences in the depth data sensed inside and outside of a sub-window. The face detection circuitry may further be to, for example, determine that a face potentially exists within the sub-window when the depth data depth sensed outside of the sub-window substantially indicates a greater depth than the depth data sensed inside of the sub-window.

The face detection circuitry may be to, for example, determine at least one dimension for the one or more sub-windows based on a distance sensed to an object in the visual data, and may then be to determine that a face potentially exists within one or more sub-windows based on the at least one dimension when the depth data depth sensed outside of the one or more sub-windows substantially indicates a greater depth than the depth data sensed inside of the one or more sub-windows. The face detection circuitry may further be to perform face detection based on the Viola-Jones Object Detection Framework. Consistent with the present disclosure, an example method for face detection may comprise capturing at least visual data and depth data corresponding to the visual data in at least one device, refining face detection in the at least one device by determining criteria for one or more sub-windows utilized to identify portions of the visual data on which face detection will be performed, wherein the criteria are based at least on the depth data and performing face detection in the at least one device utilizing the one or more sub-windows that conform to the criteria.

Figure 1:
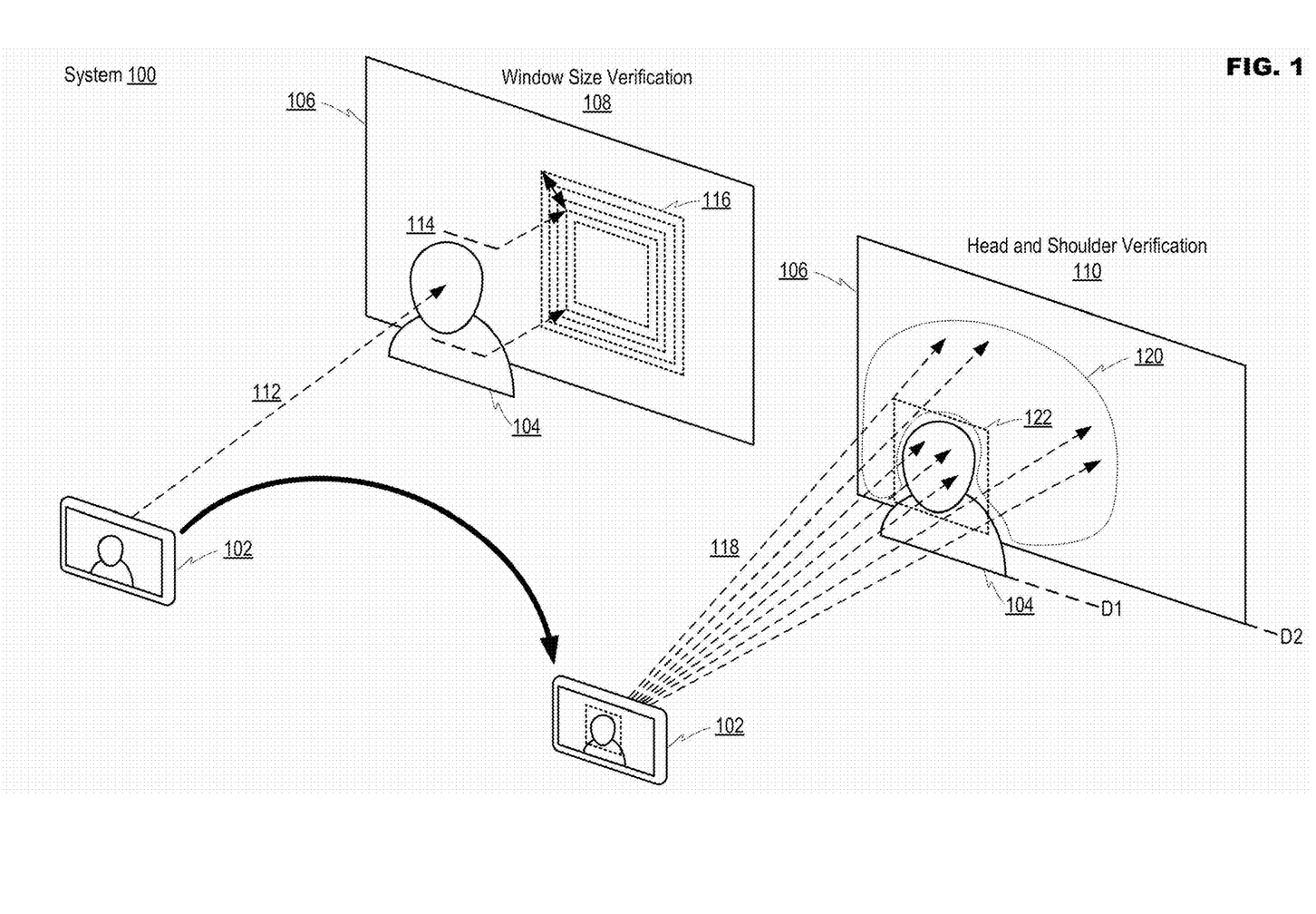
FIG. 1 illustrates an example system performing face detection window refinement using depth in accordance with at least one embodiment of the present disclosure.

FIG. 1 illustrates an example system performing face detection window refinement using depth in accordance with at least one embodiment of the present disclosure. Initially, in discussing the embodiments consistent with the present disclosure, reference may be made to face detection technologies (e.g., Viola-Jones Object Detection Framework), depth sensing technologies (e.g., the RealSense Software Developer Kit (SDK) from the Intel Corporation), etc. These various technologies have been employed to provide a readily comprehensible perspective for understanding the disclosed embodiments, and are not intended to limit any implementations to only using this type of face detection as other face detection algorithms may be employed. The inclusion of an apostrophe after an item number in a figure (e.g., 100') may indicate that an example embodiment of the item is being illustrated. These example embodiments are not intended to limit the disclosure to only what is shown, and have been presented herein merely for the sake of explanation. As referenced herein, a sub-window may identify (e.g. delineate, frame, surround, highlight, etc.) a portion of visual data on which face detection analysis will be performed. Given that the visual data is an image or video, one or more sub-windows may be defined to target different areas of the image or video where face detection may take place.

Example system 100 is disclosed in FIG. 1. System 100 may comprise at least one device 102 that may be employed in capturing visual data (e.g., an image, video, etc.) of an example scene 106 including at least one person 104. While device 102 may be referred to hereafter in the singular for the sake of clarity, it is possible for the functionality illustrated in FIG. 1 to be performed by more than one device 102 (e.g., a device comprising image capture and depth sensing capabilities may provide visual and depth data to a separate device having the data processing resources needed to perform face detection). Moreover, while only one person 104 is illustrated for the sake of clarity, scene 106 may comprise a plurality of people 104, other objects, etc. Examples of device 102 may include, but are not limited to, a mobile communication device such as a cellular handset or a smartphone based on the Android® OS from the Google Corporation, iOS® or Mac OS® from the Apple Corporation, Windows® OS from the Microsoft Corporation, Linux® OS, Tizen® OS and/or other similar operating systems that may be deemed derivatives of Linux® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, Apple Watch® from the Apple Corporation, etc., an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc. or combinations thereof.

System 100 in FIG. 1 illustrates examples wherein the sub-windows employed in face detection performed on visual data captured from scene 106. These examples include at least window size verification 108 and head and shoulder verification 110. Refining sub-windows may comprise, for example, determining a size (e.g., horizontal and vertical dimensions) for the sub-windows, determining whether the portion of scene 106 identified by a sub-window most probably surrounds a face, etc. Window size verification 108 may comprise, in general, utilizing depth data to define a probable face size in scene 106. The probable face size may be used to set the dimensions of sub-windows when performing face detection in scene 106. In this manner, sub-windows that are substantially smaller or larger than an anticipated size of a face, given a sensed distance of device 102 from person 104, may be avoided, which may reduce the number of sub-windows that need to be evaluated when performing face detection.

In one embodiment, window size verification 108 may be based on a pinhole camera mathematical model. In a pinhole camera model, an image coordinate y (e.g., how the object appears in scene 106) and object world coordinate x (e.g., the actual position of the object in a relative or absolute world-based coordinate system) may satisfy the following equation:

$$y = \frac{x}{d} f \qquad (1)$$

Where d is a distance between an object in scene 108 (e.g., the distance to person 104 as shown at 112) and an optical center, and f is a camera parameter. Here d may be the same as a depth 112 sensed by device 102. The camera parameter f may be configured during red, blue, green and depth (RGBD) calibration (e.g., to estimate the camera parameter f off-line). Based on an assumption that the object (e.g., person 104) is situated parallel to the camera, the object image size and the real size satisfy the similar equation:

$$|y1y2| = \frac{|x1x2|}{d} f \qquad (2)$$

Where |x1x2| is the absolute value of object size and |y1y2| is the absolute value of the object image size. This assumption is reasonable as a human head may be modeled as nearly spherical and is not very close to the camera. In operation, with sensed depth 112 and a face size range parameter [minimal face size, maximal face size] defined, the face image size range can be calculated as shown at 114 and the sub-window size can be adjusted as further shown at 116. If the current sub-window size is out of the face image size range, it may be rejected as not face area. For example, window size determination 114 and 116 may take place for each sub-window based on a depth 112 sensed for each sub-window. The face size range parameter [minimal face size, maximal face size] may be set a little larger than the approximate face size to increase the robustness of face detection. In an example scenario, the size of a small face (e.g., a baby's face) to be detected in scene 106 may have a diameter of approximately 15 centimeters (cm), and the size of a large face (an adult's "fat" face) to be detected may have a diameter approximately 30 cm based on sensed depth 112. The face size range parameter may then be set larger than the approximate small and large face sizes to, for example, [13 cm, 33 cm] to help ensure that faces in scene 106 are not accidentally excluded from face detection for being larger or smaller than typically expected for depth 112. As a result, device 102 does not require precise parameters to perform window size verification 108 and any error caused by an assumption of the probable head/face size will not affect the overall performance of system 100. For faster computation two integral images may be used to calculate the average depth in a sub-window, which may include valid pixel integral image and depth value integral image. The valid pixel integral image may be to calculate the pixel number with valid depth in sub-window region. The depth value integral image may be to calculate a sum of depth values. When the depth image quality is not good, the valid pixel integral image becomes more important. With it, no preprocessing method is needed for the depth image.

Figure 2:
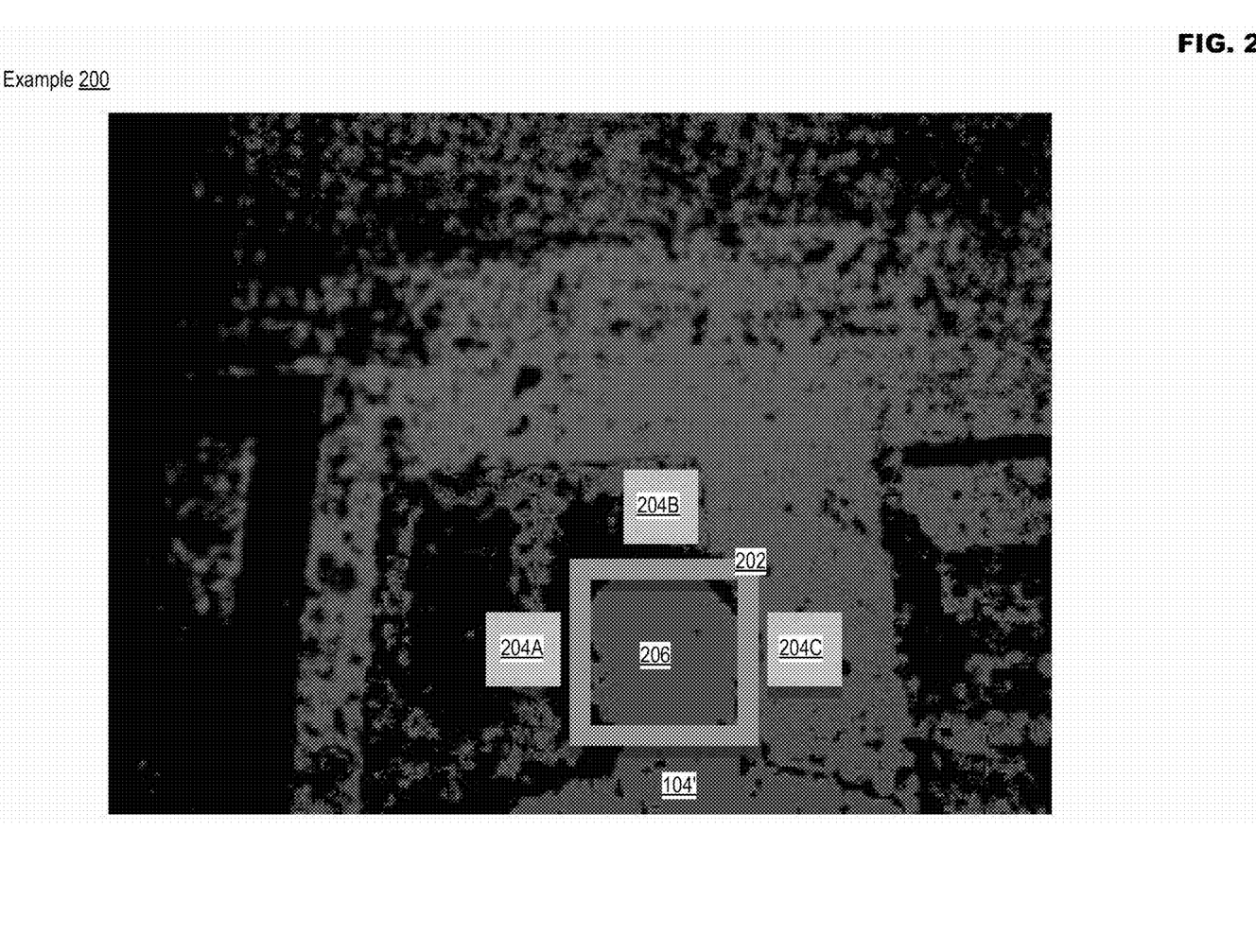
FIG. 2 illustrates an example of head and shoulder verification in accordance with at least one embodiment of the present disclosure.

Head and shoulder verification 110 is further illustrated in FIG. 1. Head and shoulder verification 110 may be employed alone or in combination with window size verification 108 to refine the sub-windows utilized for face detection. For example, window size verification 108 may be utilized initially to define dimensions for determining potential sub-windows for evaluation during face detection, and then the pool of potential sub-windows may be further reduced using head and shoulder verification 110. Head and shoulder verification 110 may, in general, analyze depth data from depth sensing 118 to determine differences in depth that occur inside and outside of sub-window 122. For example, if the depth sensed inside of sub-window 122 (e.g., represented as depth "D1" in FIG. 1 corresponding to the depth of person 104) is less than the depth sensed outside of sub-window 122 shown as 120 (e.g., represented as depth "D2" in the background of scene 106), then the head of person 104 may be assumed at least for the purpose of reducing the number of sub-windows that will need to be evaluated during face detection. FIG. 2 illustrates an example of head and shoulder verification 110 in accordance with at least one embodiment of the present disclosure. Example 200 is an image representing depth data sensed by, for example, device 102. In depth image 200, square 202 is a sub-window focused on head 206 of person 104'. Blocks 204A, 204B and 204C are on the left side, right side and top of square 202. In example 200, the depth data resulting from depth sensing inside of square 202 may indicate substantially less depth than the depth data sensed corresponding to blocks 204A, 204B and 204C. This may occur because head 206 is much closer to the depth sensing device than, for example, walls in a surrounding room corresponding to blocks 204A, 204B and 204C. Consistent with the present disclosure, the distance between square 202 and blocks 204A, 204B and 204C may be proportional to sub-window size. For faster computation, the average depth of each pixel may be calculated prior to performing face detection such as disclosed above regarding window size verification 108.

Consistent with the present disclosure, the number of sub-windows needed for face detection may be greatly reduced. As discussed above, given typical face detection methods the total number of sub-windows needed for a 640×480 images is approximately 1.4 million (e.g., depending on the search parameters). Implementing only window size verification 108, the number of sub-windows to analyze may be decreased to approximately 33,000. Head shoulder verification 108 acting alone may be able to reduce the number of sub-windows to approximately 50,000. Verifications 108 and 110 acting together may be able to decrease the number sub-windows to about 12,000, which is less than one percent of original number. Thus, a general texture-based classifier (e.g. the Viola-Jones Object Detection Framework) may only need to analyze 12,000 windows to be faces or not. High quality depth data is not required because average depth value may be used. For example, a large neighboring region (e.g., 20*20) may be used to calculate the average depth. With integral image technology the average depth calculation requires very little computation time, and no depth preprocessing is needed at all. In implementations comparing RGB-based frontal & multi-view face detection that utilized a RealSense depth-sensing camera, it has been observed that, consistent with the embodiments disclosed herein, detection speed increased about 2 to 3 times and false alarms (e.g., the identification of a face where, in actuality, no face existed) decreased about 40%.

Figure 3:
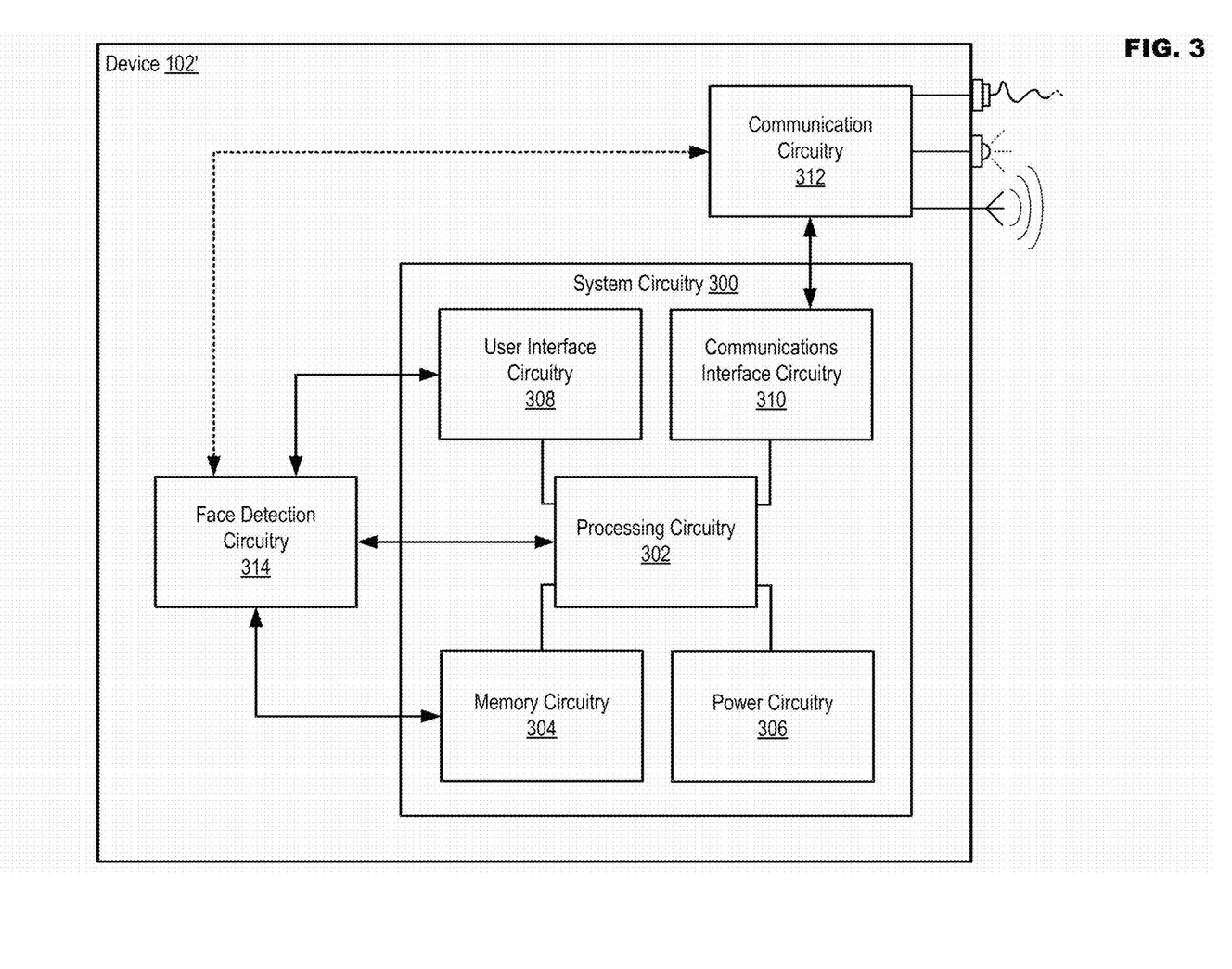
FIG. 3 illustrates an example configuration for a device usable in accordance with at least one embodiment of the present disclosure.

FIG. 3 illustrates an example configuration for a device usable in accordance with at least one embodiment of the present disclosure. For example, device 102' may be able to perform any or all activities illustrated in FIG. 1-2. However, device 102' is presented only as an example of an apparatus usable in embodiments consistent with the present disclosure, and is not intended to limit any of the embodiments to a particular manner of implementation. Moreover, while only one device 102' is shown, implementations may include more than one device 102' such as, for example, an image capture device and another device to process data.

System circuitry 300 may manage the operation of device 102'. System circuitry 300 may include, for example, processing circuitry 302, memory circuitry 304, power circuitry 306, user interface circuitry 308 and communication interface circuitry 310. Device 102' may also include communication circuitry 312 and face detection circuitry 314. While communication circuitry 312 and face detection circuitry 314 are shown as separate from system circuitry 300, the example configuration in FIG. 3 has been provided merely for the sake of explanation. Some or all of the functionality associated with communication circuitry 312 and face detection circuitry 314 may also be incorporated into system circuitry 300.

In device 102', processing circuitry 302 may comprise one or more processors situated in separate components, or alternatively one or more processing cores in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing circuitry 302 may interact with other system components that may be operating at different speeds, on different buses, etc. in device 102'. Moreover, some or all of the functionality commonly associated with the support circuitry may also be included in the same physical package as the processor (e.g., such as in the Sandy Bridge family of processors available from the Intel Corporation).

Processing circuitry 302 may be configured to execute various instructions in device 102'. Instructions may include program code configured to cause processing circuitry 302 to perform activities related to reading data, writing data, processing data, formulating data, converting data, transforming data, etc. Information (e.g., instructions, data, etc.) may be stored in memory circuitry 304. Memory circuitry 304 may comprise random access memory (RAM) and/or read-only memory (ROM) in a fixed or removable format. RAM may include volatile memory configured to hold information during the operation of device 102' such as, for example, static RAM (SRAM) or Dynamic RAM (DRAM). ROM may include nonvolatile (NV) memory circuitry configured based on BIOS, UEFI, etc. to provide instructions when device 102' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 306 may include internal power sources (e.g., a battery, fuel cell, etc.) and/or external power sources (e.g., electromechanical or solar generator, power grid, external fuel cell, etc.), and related circuitry configured to supply device 102' with the power needed to operate. User interface circuitry 308 may include hardware and/or software to allow users to interact with device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 308 may be incorporated within device 102' and/or may be coupled to device 102' via a wired or wireless communication medium. At least some of user interface circuitry 308 may be optional in certain circumstances such as, for example, a situation wherein device 102' is a server (e.g., rack server, blade server, etc.) that does not include user interface circuitry 308, and instead relies on another device (e.g., a management terminal) for user interface functionality.

Communication interface circuitry 310 may be configured to manage packet routing and other control functions for communication circuitry 312, which may include resources configured to support wired and/or wireless communications. In some instances, device 102' may comprise more than one set of communication circuitry 312 (e.g., including separate physical interface circuitry for wired protocols and/or wireless radios) managed by centralized communication interface circuitry 310. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface circuitry 310 may be configured to prevent wireless communications that are active in communication circuitry 312 from interfering with each other. In performing this function, communication interface circuitry 310 may schedule activities for communication circuitry 312 based on, for example, the relative priority of messages awaiting transmission. While the embodiment disclosed in FIG. 3 illustrates communication interface circuitry 310 being separate from communication circuitry 312, it may also be possible for the functionality of communication interface circuitry 310 and communication circuitry 312 to be incorporated into the same circuitry.

Consistent with the present disclosure, face detection circuitry 314 may include, for example, hardware alone or hardware and software. For example, face detection circuitry 314 may comprise one or more of discrete components coupled together to form circuits, integrated circuits (ICs), sets or groups of ICs (e.g., chipsets), multichip modules (MCMs), etc. In another possible configuration, face detection circuitry 314 may comprise software (e.g., code comprising instructions, data, etc.) that may transform standard circuitry such as, for example, processing circuitry 302, memory circuitry 304, etc. into specialized circuitry capable of performing operations such as illustrated in FIGS. 1 and 2. In performing these operations, face detection circuitry 314 may interact with at least processing circuitry 302, memory circuitry 304 and user interface circuitry 308. For example, face detection circuitry 314 may cause an image capture device within, or at least coupled to, user interface circuitry 308 to capture visual data and depth data (e.g., of scene 106). Face detection circuitry 314 may then interact with processing circuitry 302 and/or memory circuitry 304 to analyze the image data in view of the depth data. The analysis may comprise, for example, one or more of window size verification 108, head and shoulder verification 110 and face detection. In a at least one embodiment, face detection circuitry 314 may also interact with communication circuitry 312 to, for example, receive visual data and depth data from an external device (e.g., a device including both image capture and depth sensing circuitry), to provide the results of face detection to another device (e.g., a facial identification system), etc.

Figure 4:
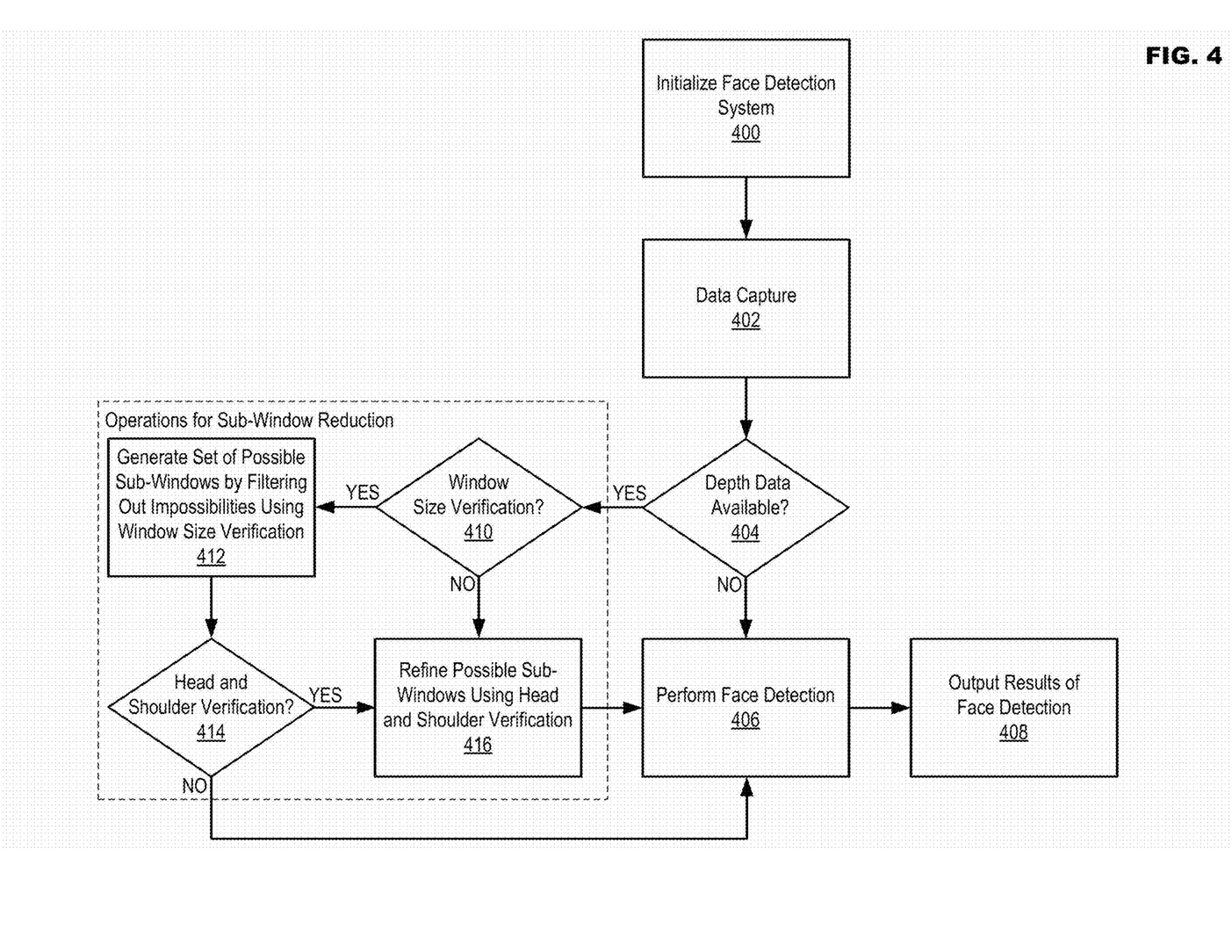
FIG. 4 illustrates example operations for face detection window refinement using depth in accordance with at least one embodiment of the present disclosure.

FIG. 4 illustrates example operations for face detection window refinement using depth in accordance with at least one embodiment of the present disclosure. In operation 400 a face detection system may be initialized. For example, initialization may occur automatically due to activation of a device in the system, activation of an application on a device in the system, a capture device sensing activity such as motion, etc., manually due to user interaction with a device, application or utility, etc. Data capture may then take place in operation 402. A determination may then be made in operation 404 as to whether depth data is available as part of the data capture. If in operation 404 it is determined that depth data is not available, then in operation 406 face detection may be performed. For example, face detection may be performed using the Viola-Jones Object Detection Framework. In this instance the face detection may be deemed "standard" face detection in that no depth data was available to reduce the number of sub-windows that needed to be evaluated during face detection. The results of face detection (e.g., the number of faces detected, the locations of detected faces within an image, etc.) may then be output in operation 408.

If it is determined in operation 404 that depth data is available from the data capture that occurred in operation 402, then operations for sub-window reduction may be performed (e.g., operations 410 to 416). In operations 410 to 416 window size verification and/or head and shoulder verification may be performed. A determination may be made in operation 410 as to whether window size verification should be performed. If in operation 410 it is determined that window size verification should be performed, then in operation 412 a set of possible sub-windows may be generated based on filtering out impossibilities (e.g., windows that could not include a face) based on window size verification. For example, the depth data for each sub-window may be utilized to approximate dimensions of a face at that depth, and the sub-window may then be selected or rejected based on the approximate face dimensions. A determination may then be made in operation 414 as to whether head and shoulder verification should be performed. A determination in operation 414 that head and shoulder verification should not be performed may be followed by a return to operation 406 to perform face detection using only the set of sub-windows that was determined in operation 412. A determination in operation 410 that window size verification should not be performed, or a determination in operation 414 that head and shoulder verification should be performed, may then be followed by operation 416 wherein the possible sub-windows for evaluation in operation 406 may be refined using head and should verification. In operation 416 the difference between depth data corresponding to the inside and outside of each sub-window may be evaluated. For example, an occurrence wherein the depth data outside of the sub-window indicates a substantially greater depth than the depth data inside of the sub-window may be indicative of a person's head, and should be evaluated in operation 406. Operation 416 may then be followed by a return to operation 406 to perform face detection.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to face detection window refinement using depth. Existing face detection systems may perform face detection by analyzing portions of visual data such as an image, video, etc. identified by sub-windows. These sub-windows are now determined only based on pixels, and thus may number in the millions. Consistent with the present disclosure, at least depth data may be utilized to refine the size and appropriateness of sub-windows that identify portions of the visual data to analyze during face detection, which may substantially reduce the number of sub-windows to be analyzed, the total data processing burden, etc. For example, at least one device may comprise user interface circuitry including capture circuitry to capture both visual data and depth data. Face detection circuitry in the at least one device may refine face detection by determining criteria for configuring the sub-windows that will be used in face detection.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for face detection window refinement using depth.

According to example 1 there is provided at least one device to perform face detection. The at least one device may comprise user interface circuitry including at least capture circuitry to capture at least visual data and depth data corresponding to the visual data and face detection circuitry to refine face detection by determining criteria for one or more sub-windows utilized to identify portions of the visual data on which face detection will be performed, wherein the criteria are based at least on the depth data, and perform face detection utilizing the one or more sub-windows that conform to the criteria.

Example 2 may include the elements of example 1, wherein the visual data comprises at least one of image data or video data.

Example 3 may include the elements of any of examples 1 to 2, wherein the criteria comprise at least one dimension of the one or more sub-windows.

Example 4 may include the elements of example 3, wherein the at least one dimension comprises at least a diameter of a circle corresponding to the expected size of a face based on the depth data.

Example 5 may include the elements of any of examples 3 to 4, wherein the face detection circuitry is to determine the criteria based on a distance sensed to at least one object in the visual data.

Example 6 may include the elements of example 5, wherein the sensed distance is an average distance determined based on two integral images including a pixel integral image and a depth value integral image.

Example 7 may include the elements of any of examples 5 to 6, wherein the face detection circuitry is to determine the at least one dimension based on an approximation of a size at which a human face would appear in the visual data at the sensed distance.

Example 8 may include the elements of example 7, wherein the criteria includes a value range corresponding to the at least one dimension, the value range being increased to exceed an actual range for the at least one dimension to increase robustness in face detection.

Example 9 may include the elements of any of examples 1 to 8, wherein the criteria comprise at least one difference in depth data.

Example 10 may include the elements of example 9, wherein the face detection circuitry is to determine the criteria based on differences in the depth data sensed inside and outside of a sub-window.

Example 11 may include the elements of example 10, wherein the face detection circuitry is to determine that a face potentially exists within the sub-window when the depth data depth sensed outside of the sub-window substantially indicates a greater depth than the depth data sensed inside of the sub-window.

Example 12 may include the elements of any of examples 1 to 11, wherein the face detection circuitry is to determine at least one dimension for the one or more sub-windows based on a distance sensed to an object in the visual data, and is to then determine that a face potentially exists within one or more sub-windows based on the at least one dimension when the depth data depth sensed outside of the one or more sub-windows substantially indicates a greater depth than the depth data sensed inside of the one or more sub-windows.

Example 13 may include the elements of any of examples 1 to 12, wherein the face detection circuitry is to perform face detection based on the Viola-Jones Object Detection Framework.

Example 14 may include the elements of any of examples 1 to 13, wherein the criteria comprise at least one dimension of the one or more sub-windows and the face detection circuitry is to determine the criteria based on a distance sensed to an object in the visual data.

According to example 15 there is provided a method for face detection. The method may comprise capturing at least visual data and depth data corresponding to the visual data in at least one device, refining face detection in the at least one device by determining criteria for one or more sub-windows utilized to identify portions of the visual data on which face detection will be performed, wherein the criteria are based at least on the depth data and performing face detection in the at least one device utilizing the one or more sub-windows that conform to the criteria.

Example 16 may include the elements of example 15, wherein the criteria are determined based on a distance sensed to at least one object in the visual data.

Example 17 may include the elements of example 16, wherein the sensed distance is an average distance determined based on two integral images including a pixel integral image and a depth value integral image.

Example 18 may include the elements of any of examples 16 to 17, wherein the criteria comprise at least one dimension determined based on an approximation of a size at which a human face would appear in the visual data at the sensed distance.

Example 19 may include the elements of example 18, wherein the criteria includes a value range corresponding to the at least one dimension, the value range being increased to exceed an actual range for the at least one dimension to increase robustness in face detection.

Example 20 may include the elements of any of examples 15 to 19, wherein the criteria are determined based on differences in the depth data sensed inside and outside of a sub-window.

Example 21 may include the elements of example 20, and may further comprise determining that a face potentially exists within the sub-window when the depth data depth sensed outside of the sub-window substantially indicates a greater depth than the depth data sensed inside of the sub-window.

Example 22 may include the elements of any of examples 15 to 21, and may further comprise determining at least one dimension for the one or more sub-windows based on a distance sensed to an object in the visual data and determining that a face potentially exists within one or more sub-windows based on the at least one dimension when the depth data depth sensed outside of the one or more sub-windows substantially indicates a greater depth than the depth data sensed inside of the one or more sub-windows.

Example 23 may include the elements of any of examples 15 to 22, wherein the face detection is based on the Viola-Jones Object Detection Framework.

According to example 24 there is provided a system including at least one device, the system being arranged to perform the method of any of the above examples 15 to 23.

According to example 25 there is provided a chipset arranged to perform the method of any of the above examples 15 to 23.

According to example 26 there is provided at least one machine readable medium comprising a plurality of instructions that, in response to be being executed on a computing device, cause the computing device to carry out the method according to any of the above examples 15 to 23.

According to example 27 there is provided at least one device configured for face detection, the at least one device being arranged to perform the method of any of the above examples 15 to 23.

According to example 28 there is provided a system for face detection. The system may comprise means for capturing at least visual data and depth data corresponding to the visual data in at least one device, means for refining face detection in the at least one device by determining criteria for one or more sub-windows utilized to identify portions of the visual data on which face detection will be performed, wherein the criteria are based at least on the depth data and means for performing face detection in the at least one device utilizing the one or more sub-windows that conform to the criteria.

Example 29 may include the elements of example 28, wherein the criteria are determined based on a distance sensed to at least one object in the visual data.

Example 30 may include the elements of example 29, wherein the sensed distance is an average distance determined based on two integral images including a pixel integral image and a depth value integral image.

Example 31 may include the elements of any of examples 29 to 30, wherein the criteria comprise at least one dimension determined based on an approximation of a size at which a human face would appear in the visual data at the sensed distance.

Example 32 may include the elements of example 31, wherein the criteria includes a value range corresponding to the at least one dimension, the value range being increased to exceed an actual range for the at least one dimension to increase robustness in face detection.

Example 33 may include the elements of any of examples 28 to 32, wherein the criteria are determined based on differences in the depth data sensed inside and outside of a sub-window.

Example 34 may include the elements of example 33, and may further comprise means for determining that a face potentially exists within the sub-window when the depth data depth sensed outside of the sub-window substantially indicates a greater depth than the depth data sensed inside of the sub-window.

Example 35 may include the elements of any of examples 28 to 34, and may further comprise means for determining at least one dimension for the one or more sub-windows based on a distance sensed to an object in the visual data and means for determining that a face potentially exists within one or more sub-windows based on the at least one dimension when the depth data depth sensed outside of the one or more sub-windows substantially indicates a greater depth than the depth data sensed inside of the one or more sub-windows.

Example 36 may include the elements of any of examples 28 to 35, wherein the face detection is based on the Viola-Jones Object Detection Framework.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. At least one device to perform face detection, comprising:
   user interface circuitry including at least capture circuitry to capture at least visual data and depth data corresponding to the visual data; and
   face detection circuitry to:
      refine face detection by determining criteria for one or more sub-windows utilized to identify portions of the visual data on which face detection will be performed;
         wherein the criteria are based at least on the depth data; and
         wherein each of the one or more sub-windows includes an area having a first size;
      dispose at least one block proximate at least a portion of each of the one or more sub-windows;
         wherein the at least one block includes an area having a second size less than the first size; and
      perform face detection utilizing the one or more sub-windows that conform to the criteria, responsive to a determination that the depth data corresponding to a respective sub-window differs from the depth data corresponding to a block disposed proximate the respective sub-window.

2. The at least one device of claim 1, wherein the visual data comprises at least one of image data or video data.

3. The at least one device of claim 1, wherein the criteria comprise at least one dimension of the one or more sub-windows.

4. The at least one device of claim 3, wherein the face detection circuitry is to determine the criteria based on a distance sensed to at least one object in the visual data.

5. The at least one device of claim 4, wherein the face detection circuitry is to determine the at least one dimension based on an approximation of a size at which a human face would appear in the visual data at the sensed distance.

6. The at least one device of claim 1, wherein the criteria comprise at least one difference in depth data.

7. The at least one device of claim 6, wherein the face detection circuitry is to determine the criteria based on differences in the depth data sensed inside and outside of a sub-window.

8. The at least one device of claim 7, wherein the face detection circuitry is to determine that a face potentially exists within the sub-window when the depth data depth sensed outside of the sub-window substantially indicates a greater depth than the depth data sensed inside of the sub-window.

9. The at least one device of claim 1, wherein the face detection circuitry is to determine at least one dimension for the one or more sub-windows based on a distance sensed to an object in the visual data, and is to then determine that a face potentially exists within one or more sub-windows based on the at least one dimension when the depth data depth sensed outside of the one or more sub-windows substantially indicates a greater depth than the depth data sensed inside of the one or more sub-windows.

10. The at least one device of claim 1, wherein the face detection circuitry is to perform face detection based on the Viola-Jones Object Detection Framework.

11. A method for face detection, comprising:
capturing at least visual data and depth data corresponding to the visual data in at least one device;
refining face detection in the at least one device by determining criteria for one or more sub-windows utilized to identify portions of the visual data on which face detection will be performed;
wherein the criteria are based at least on the depth data; and
wherein each of the one or more sub-windows includes an area having a first size;
disposing at least one block proximate at least a portion of each of the one or more sub-windows;
wherein the at least one block includes an area having a second size less than the first size;
determining, for each of the one or more sub-windows that conform to the criteria, whether the depth data corresponding to the respective sub-window differs from the depth data corresponding to the at least one block disposed proximate the respective sub-window; and
performing face detection in the at least one device utilizing the one or more sub-windows that conform to the criteria, responsive to a determination that the depth data corresponding to the respective sub-window differs from the depth data corresponding to a block disposed proximate the respective sub-window.

12. The method of claim 11, wherein the criteria are determined based on a distance sensed to at least one object in the visual data.

13. The method of claim 12, wherein the criteria comprise at least one dimension determined based on an approximation of a size at which a human face would appear in the visual data at the sensed distance.

14. The method of claim 11, wherein the criteria are determined based on differences in the depth data sensed inside and outside of a sub-window.

15. The method of claim 14, further comprising:
determining that a face potentially exists within the sub-window when the depth data depth sensed outside of the sub-window substantially indicates a greater depth than the depth data sensed inside of the sub-window.

16. The method claim 11, further comprising:
determining at least one dimension for the one or more sub-windows based on a distance sensed to an object in the visual data; and
determining that a face potentially exists within one or more sub-windows based on the at least one dimension when the depth data depth sensed outside of the one or more sub-windows substantially indicates a greater depth than the depth data sensed inside of the one or more sub-windows.

17. The method of claim 11, wherein the face detection is based on the Viola-Jones Object Detection Framework.

18. At least one non-transitory machine-readable storage medium having stored thereon, individually or in combination, instructions for face detection that, when executed by one or more processors, cause the one or more processors to:
capture at least visual data and depth data corresponding to the visual data in at least one device;
refine face detection in the at least one device by determining criteria for one or more sub-windows utilized to identify portions of the visual data on which face detection will be performed;
wherein the criteria are based at least on the depth data; and
wherein each of the one or more sub-windows includes an area having a first size;
dispose at least one block proximate at least a portion of each of the one or more sub-windows;
wherein the at least one block includes an area having a second size less than the first size;
determine, for each of the one or more sub-windows that conform to the criteria, whether the depth data corresponding to the respective sub-window differs from the depth data corresponding to the at least one block disposed proximate the respective sub-window; and
perform face detection in the at least one device utilizing the one or more sub-windows that conform to the criteria, responsive to a determination that the depth data corresponding to the respective sub-window differs from the depth data corresponding to a block disposed proximate the respective sub-window.

19. The storage medium of claim 18, wherein the criteria are determined based on a distance sensed to at least one object in the visual data.

20. The storage medium of claim 19, wherein the criteria comprise at least one dimension determined based on an approximation of a size at which a human face would appear in the visual data at the sensed distance.

21. The storage medium of claim 18, wherein the criteria are determined based on differences in the depth data sensed inside and outside of a sub-window.

22. The storage medium of claim 21, further comprising instructions that, when executed by one or more processors, cause the one or more processors to:
determine that a face potentially exists within the sub-window when the depth data depth sensed outside of the sub-window substantially indicates a greater depth than the depth data sensed inside of the sub-window.

23. The storage medium of claim 18, further comprising instructions that, when executed by one or more processors, cause the one or more processors to:
determine at least one dimension for the one or more sub-windows based on a distance sensed to an object in the visual data; and
determine that a face potentially exists within one or more sub-windows based on the at least one dimension when the depth data depth sensed outside of the one or more sub-windows substantially indicates a greater depth than the depth data sensed inside of the one or more sub-windows.

24. The storage medium of claim 18, wherein the face detection is based on the Viola-Jones Object Detection Framework.

* * * * *